UNITED STATES PATENT OFFICE.

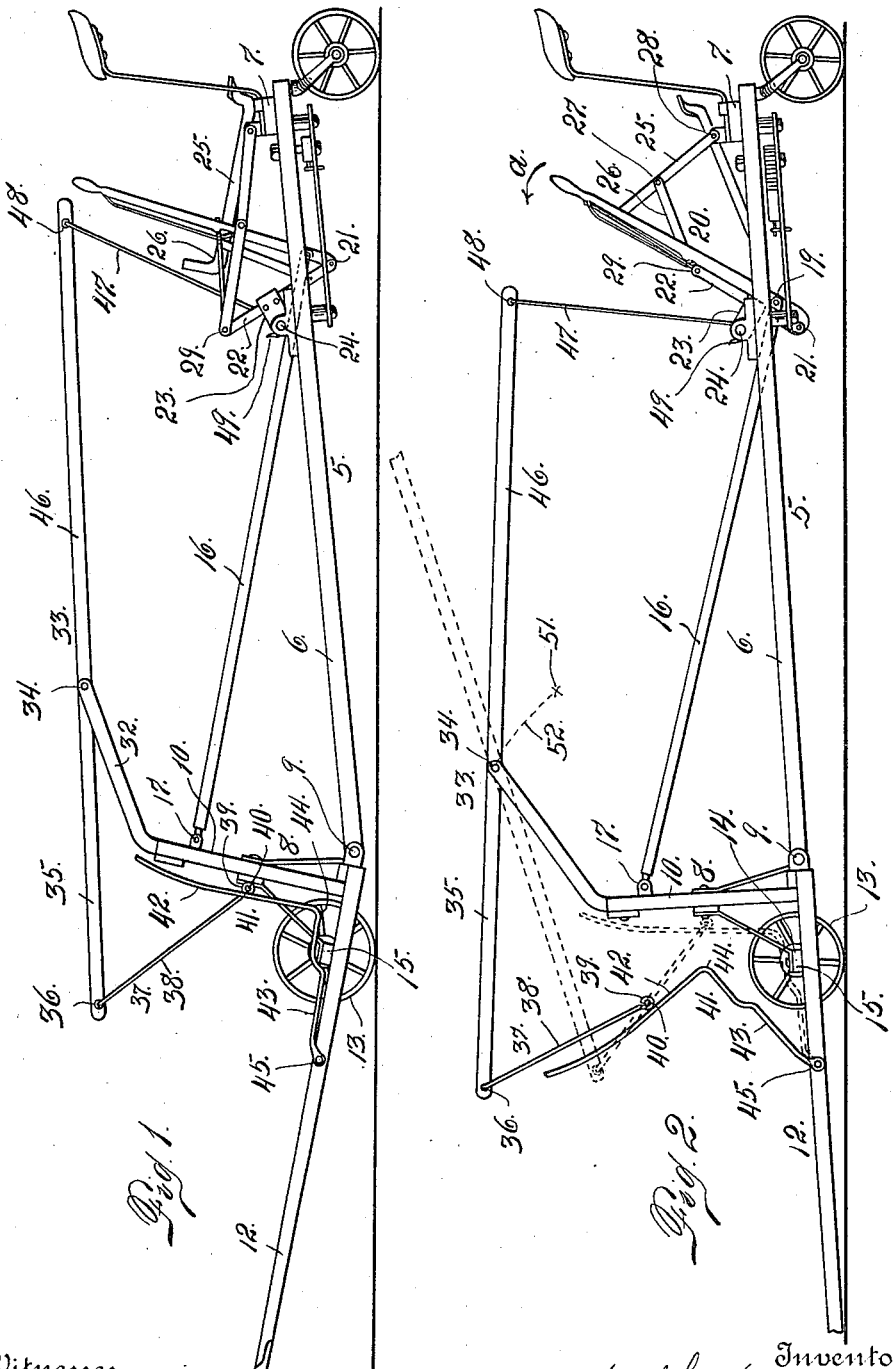

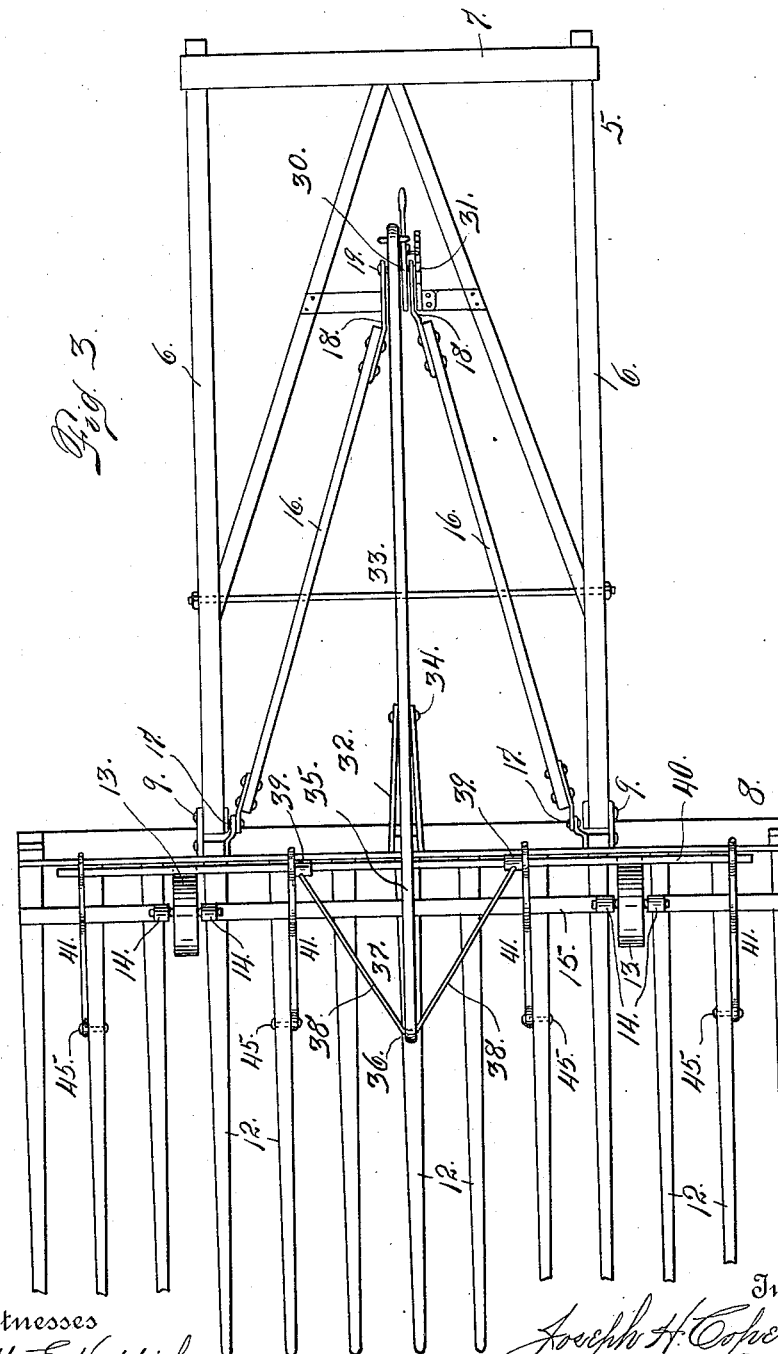

JOSEPH H. COPE, OF WINDSOR, COLORADO.

UNLOADING ATTACHMENT FOR SWEEP-RAKES.

1,034,692. Specification of Letters Patent. Patented Aug. 6, 1912.

Application filed July 31, 1911. Serial No. 641,471.

*To all whom it may concern:*

Be it known that I, JOSEPH H. COPE, citizen of the United States, residing at Windsor, in the county of Weld and State of Colorado, have invented certain new and useful Improvements in Unloading Attachments for Sweep-Rakes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for automatically unloading sweep rakes, the latter being employed in collecting hay from the field and carrying it to the stack. In this construction, the head of the rake is mounted upon an axle and is arranged to pivot thereon in such a manner that the teeth or portion of the rake extending forwardly from the axle may be thrown upwardly for the purpose of supporting the load thereon, or downwardly into the position for collecting the hay from the field, as may be desired. In rakes of this character, the rear portion of the head extends upwardly from the plane of the teeth, forming a stop for the load of hay collected on the teeth. In my improved construction, a relatively long lever is fulcrumed on the upper extremity of the upright rear portion of the rake head, the rear extremity of the lever beyond the fulcrum being arranged to be connected with the frame of the machine in such a manner as to maintain the lever in a fixed position during the unloading operation. The forward arm of the lever, or the portion projecting forward of the fulcrum, is connected with a series of unloading members, each of which is approximately of right angular shape, the other members being pivotally connected with the teeth of the rake head forward of the angle. All of these unloading members are secured to a rod extending transversely across the head and connected with the upwardly-projecting parts of the right angled shaped members. This rod is connected with the forward extremity of the forward arm of a lever, the construction and arrangement being such that, when the toothed portion of the rake head is tilted upwardly for traveling purposes, the unloading members occupy a rearward position, their lower parts being approximately parallel with the teeth of the rake head, while the upwardly-projecting parts are approximately parallel with the upwardly-projecting rear portion of the rake head. When, however, the toothed portion of the rake head is moved downwardly for unloading purposes, the change of position of the rear portion of the rake head is such as to change the relative position of the aforesaid lever, whereby its forward arm is tilted upwardly from the fulcrum, thus imparting a forward movement to the unloading members and giving such an impetus to the load carried by the rake head as to discharge the same or throw it into such position that, by moving the rake rearwardly, the latter is completely detached from the hay, leaving the latter in the desired position with reference to the stack.

The manner of manipulating the rake head is immaterial, and any suitable provision may be made for tilting the same upon its axle. In a simultaneously pending application No. 627,990, I have disclosed the form of construction which I prefer to employ for the purpose, but the mechanism employed is immaterial, so far as my present invention is concerned, as the operation of my present improvement will be the same regardless of the means employed for tilting the rake head.

It should be explained that, during the operation of collecting the hay upon the rake head, the aforesaid lever is released at its rearward extremity, whereby, when the toothed portion of the rake head is in the lowered position, the unloading members may occupy positions approximately parallel with the adjacent portions of the rake head.

Having briefly outlined my improved construction, I will proceed to describe the same in detail, reference being made to the accompanying drawing, in which is illustrated an embodiment thereof.

In the drawings: Figure 1 is a side elevation of a sweep rake equipped with my improved construction, the rake being shown in position with the toothed portion of the head tilted upwardly, as is required when the machine is traveling with a load of hay thereon, the load being indicated in dotted outline. Fig. 2 is a side elevation of the same, the rake, however, being shown, with its toothed portion tilted downwardly with the unloading attachment in position to discharge the load from the head, in full lines, while the same feature is indicated by dotted lines showing its position while collecting the load upon the head, the corresponding position of the lever and the means for connecting the latter with the unloading feature being also indicated by dotted lines. Fig. 3 is a top plan view of a sweep rake equipped with my improvements, the unloading feature being in the position shown in Fig. 1. In this view, the mechanism for manipulating the rake head, whereby its toothed portion is tilted either upwardly or downwardly, is different in form from that shown in Figs. 1 and 2.

The same reference characters indicate the same parts in all of the views.

Let the numeral 5 designate the rear portion of the framework of the machine, the form of the same being that of a rectangle, composed of parallel side bars 6 and a rear transverse bar 7. The forward extremities of the bars 6 are pivotally connected with the rake head 8, as shown at 9, or slightly in the rear of the angle formed by the upright part 10 and the toothed portion 12 of the head. The rake head is supported upon ground wheels 13, which are journaled in bearings 14 mounted on a cross beam 15, secured to the teeth near their rear extremities and slightly forward of the upright portion 8 of the head. By virtue of this arrangement, the head is tiltable around the axes of the wheels 13, as a center, for the purpose of throwing the head of the rake into the position shown in Fig. 1 for maintaining the load thereon, or into the position shown in Fig. 2 for the purpose of discharging the load. This tilting operation is accomplished through the instrumentality of two rods 16, whose forward extremities are pivotally connected with the upright portion 10 of the rake head, as shown at 17, while their rear extremities terminate in metal straps 18, which are pivotally connected, as shown at 19, with a hand lever 20, which may be of any suitable form of construction.

In the form illustrated in Figs. 1 and 2, I have shown in a general way the construction disclosed in Figs. 7 and 8 of my simultaneously pending application No. 627,990 entitled "Improvements in power lift sweep rakes". While this mechanism will not be described in extreme detail in my present application, a brief reference thereto will be made. The lever 20 is pivotally connected, as shown at 21, with the lower extremity of a bar 22 having a short arm 23 rigidly connected thereto and pivoted at 24 on the frame 5. Two links 25 and 26 are pivotally connected together, as shown at 27, the rear extremity of the link 25 being pivoted on the framework, as shown at 28, while the forward extremity of the link 26 is pivotally connected with the upper extremity of the pivoted bar 22, as shown at 29. The lever 20, when it is pushed forwardly or in the direction of arrow $a$, carries the pivoted bar 22 with it, both devices turning on the pivot 24, while the relation of the bar 22 and the lever 20 to each other remains unchanged. In other words, during the forward movement of the lever 20, the pivot 24 becomes its fulcrum. As soon as the lever 20 is in the forward position, the links 25 and 26 assume the position shown in Fig. 1, thus locking the pivoted bar 22 against rearward movement. When the lever 20 is moved forwardly, there is a rearward pull on the rods 16, whereby the upper portion of the rake head is also moved rearwardly and the toothed portion 12 tilted upwardly. Now, after the forward thrust of the lever 20, its rearward movement to the position shown in Fig. 1 will also impart a further rearward pull upon the rods 26, tilting the toothed portion 12 of the rake head to its upward limit of movement. This rearward pull upon the rods 16, by the rearward movement of the lever 20, is due to the fact that the pivoted bar 22, being locked against rearward movement, the lever 20 turns upon its true fulcrum 21, and, as the rods 22 are connected with the lever 20 above the fulcrum 21, the rearward movement of the lever must impart a further rearward movement to the rods 16 and the upright portion of the rake head, as will be readily understood. It is believed that further detailed description of this mechanism will not be necessary.

In the form of construction shown in Fig. 3, the means for imparting the tilting movement to the rake head consists of an ordinary lever 30, suitably connected with the rods 16 and operating in connection with a quadrant 31 in the usual manner. The upper extremity of the rear upright portion 10 of the rake head is provided with a pair of rearwardly and upwardly extending arms 32, to whose outer extremities the unloading lever 33 is fulcrumed, as shown at 34. The forward arm 35 of this lever is pivotally connected, as shown at 36, with the apex of a V-shaped rod 37, the members 38 of this rod diverging from each other as they extend downwardly, their lower extremities being pivotally connected, as shown at 39, with a transversely-arranged rod 40, extending nearly the entire transverse length of the rake head. This rod 40 is rigidly secured to a number of unloading members 41, composed of two parts 42 and 43, extending approximately at right angles to each other. When these unloading members are in their normal position,— that is to say, during the collection of the hay upon the rake head and while carrying the same to the stack,—the part 42 extends upwardly from the angle 44, while the part 43 extends forwardly from this angle, its forward extremity being pivotally connected with a rake tooth, as shown at 45. The rod 40 is secured to the upright parts 42 of the unloading members about midway of their length. The rear extremity of the rear arm 46 of the lever 33 is equipped with a rod 47, whose upper extremity is pivotally connected with the lever, as shown at 48, and whose lower extremity is provided with a hook 49, adapted to be detachably connected with the pivot pin 24 of the pivot bar 22 for the purpose of maintaining the lever in position for carrying the hay to the stack, and also while unloading the same, since the lever is connected to the pivot pin 24 during both operations.

During the operation of collecting the hay upon the rake head, the rod 47 is disconnected from the pivot 24 to allow the rear arm of the lever to move upwardly whereby the lever, together with the unloading members of the structure, assume the dotted line position in Fig. 2. By releasing the hook 49, the unloading members are permitted to occupy the same position, with relation to the members 8 and 12 of the rake head, when the toothed portion of the rake head is in its lowermost position, for hay collecting purposes, as the unloading members occupy when the toothed portion of the rake head is in the elevated position, as shown in Fig. 1.

From the foregoing description, the use and operation of a sweep rake, equipped with my improved unloading mechanism, will be readily understood. During the operation of collecting the hay, the lever 33 and the unloading members 41 are in the dotted line position in Fig. 2, the position of the rake, when collecting the hay, being otherwise shown in full lines in said last-named figure. As soon as the load of hay is collected upon the toothed portion 12 of the head, the said head is tilted to throw it to the position shown in Fig. 1, whereby its toothed portion extends upwardly from the axis of the ground wheels 13. This is accomplished by the operation of a hand lever 20 or 30, as the case may be. When the rake head is thrown to the position shown in Fig. 1, the rear arm 46 of the lever 33 is moved downwardly, allowing the lower or hooked extremity of the rod 47 to be connected with the pivot pin 24, without effort on the part of the person in charge of the machine. As soon as this is done, the load of hay may be carried to the stack upon the rake. As soon as the stack is reached and it is desired to unload, the rake head is lowered to the position shown in Fig. 2. This is done through the operation of the lever 20 or 30, as the case may be. As the rake head moves from the position shown in Fig. 1 to that shown in Fig. 2, the fulcrum of the lever 33 moves approximately from a position 51 (see Fig. 2) to the position shown in the same figure. Hence, the upper extremities of the arms 32 move upwardly in a path indicated by the dotted arc 52, struck from the axis of the wheels 13, as a center. During this upward movement, the position of the lever 33, with reference to the rake head, is changed from that shown in Fig. 1 to that shown in Fig. 2, whereby the forward arm 35 of the lever is raised, and its rearward arm 46 depressed. This upward movement of the forward arm, which is greatest at the forward extremity of the said arm, is sufficient to throw the unloading members 41 from the relative position indicated by full lines in Fig. 2 and by dotted lines in Fig. 1 to the full line position in Fig. 2, the said members being moved forwardly, turning on their pivots 45, this forward movement being sufficient to throw the load of hay forward, practically disengaging the same from the rake head, so that, by backing the rake a short distance, the head is completely detached from the load of hay, the latter being left at the stack, as is required.

Attention is called to the fact that it would be practicable to operate the unloading device by manually actuating the lever 20, and, for this purpose, it would not be necessary that the rake head should be tiltable. In other words, after the hay is collected upon the head, it would only be necessary for the person in charge of the machine to pull the rearward extremity of the lever 20 downwardly in order to actuate the unloading means for throwing the load forwardly in the unloading direction. Attention is further called to the fact that when the load is discharged automatically, the weight of the load itself practically serves to perform the unloading function, since, as soon as the rake head is released, the weight of the load throws it suddenly to its downward limit of movement, whereby a quick operation is given to the unloading device.

Having thus described my invention, what I claim as new and desire to secure by Letters Patent is:

1. The combination with a sweep rake having a wheel supported head tiltable from the wheel axis as a center, of unloading members each having parts projecting both upwardly and forwardly, forming a rearwardly-located angle, the forward parts of these members being pivotally connected with the toothed portion of the rake head, and a lever fulcrumed above the rake head, its arm, forward of the fulcrum, being connected with the unloading members, while its arm, in the rear of the fulcrum, is connected with the frame of the machine.

2. The combination with a sweep rake having a ground wheel supported head tiltable from the axis of the said wheels as a center, of unloading members located above the toothed portion of the rake head, the said members normally extending both forwardly and upwardly, forming with each other, approximately right angles, the forward extremities of the forwardly-projecting parts being pivotally connected with the toothed portion of the rake head, means for connecting the upwardly-projecting parts of all of the unloading members, a relatively long lever extending lengthwise of the machine and fulcrumed on the rear portion of the rake head, the arm of the lever extending forward of the fulcrum being suitably connected with the upwardly-projecting parts of the unloading members, while the arm of the lever, extending rearwardly from the fulcrum, is detachably connected to the rear portion of the framework of the machine, whereby, as the rake head is tilted to throw its toothed portion downwardly from the wheel axis, the unloading members will be thrown forwardly, turning on their pivoted extremities, for the purpose set forth.

3. The combination with a sweep rake, of an unloading device having parts extending both forwardly and upwardly, forming approximately a right angle, located just above the rear extremity of the toothed portion of the rake head, the forwardly-extending part of the unloading device being pivotally connected to the toothed portion of the rake head, a relatively long lever extending lengthwise of the machine and fulcrumed intermediate its extremities at the top of the rear portion of the rake head, a suitable connection between the forward extremity of the forward arm of the lever and the upwardly-projecting part of the unloading device, the rear extremity of the rear arm of the lever being detachably connected with the rear portion of the framework of the machine, substantially as described.

4. The combination with a sweep rake having a tiltable head, of an unloading device carried by the rake head, the same being angle-shaped and having parts projecting both upwardly and forwardly from the said angle when the unloading device is in its normal or inactive position, the forward portion of the unloading device being pivotally connected with the toothed portion of the rake head, a lever extending longitudinally of the machine and fulcrumed intermediate its extremities upon the top of the rear portion of the rake head, a rod pivotally connected to the upwardly- extending portion of the unloading device at one extremity and with the forward arm of the lever at its opposite extremity, the rear arm of the lever being detachably connected with the rear portion of the framework of the machine, for the purpose set forth.

5. The combination with a sweep rake, having a tiltable head and means for manipulating the head for the purpose of raising and lowering the toothed portion of the head, of an unloading device carried by the head and consisting of two parts forming with each other a right angle approximately, the forward extremity of one part being pivotally connected with the toothed portion of the rake head, and a lever fulcrumed intermediate its extremities on the rear portion of the rake head and having its forward arm movably connected with the upwardly-projecting part of the unloading device, substantially as described.

6. The combination with a sweep rake, having a tiltable head and equipped with means for tilting the head, whereby its forwardly-extending toothed portion may be upwardly or downwardly inclined from the tilting axis, of an unloading device carried by the rack head and consisting of upwardly and forwardly-projecting parts forming with each other approximately right angles, the forward extremity of the forwardly-projecting part of the unloading device being pivotally connected with the toothed portion of the rake head, and a lever fulcrumed on the upper extremity of the rear portion of the rack head, its forward extremity being pivotally connected with the upwardly projecting part of the unloading device, substantially as described.

7. The combination with a sweep rake having a tiltable head, of an unloading device carried by the head and having its forward extremity pivotally connected with the toothed portion of the head, a lever extending longitudinally of the machine and fulcrumed intermediate its extremities on the top of the rear portion of the head, and a portion of the rake head, its forward extremity of the lever and the rear portion of the unloading device, substantially as described.

8. The combination with a sweep rake having a tiltable head, and means for imparting tilting movement to the head, of an unloading device whose forward extremity is pivotally connected with the toothed portion of the rake head, and a lever fulcrumed on the top of the rear portion of the rake head, intermediate the extremities of the lever, the forward extremity of the lever being movably connected with the rear portion of the unloading device, and the rear extremity of the lever being adapted to be connected with the rear portion of the framework of the machine, for the purpose specified.

9. The combination with a sweep rake, having a tiltable head and unloading means carried by the rake, and means also mounted on the rake, connected with the unloading means and actuated by the downward movement of the rake head under the influence of the load to discharge the load from the head.

10. A tiltable head sweep rake equipped with unloading means, and an operating lever connected with the unloading means and with the head to be actuated by the downward movement of the head under the influence of the load.

11. The combination with a sweep rake, of an unloading device carried by the head and having its forward extremity movably connected with the toothed portion of the head, a lever extending longitudinally of the machine and fulcrumed intermediate its extremities on the top of the rear portion of the head, and an operative connection between the forward extremity of the lever and the unloading device, substantially as described.

12. The combination with a sweep rake, of an unloading device carried by the rake head and having its forward extremity movably connected with the toothed portion of the head, a lever extending longitudinally of the machine and fulcrumed intermediate its extremities, and a suitable connection between the forward extremity of the lever and the rear portion of the unloading device, substantially as described.

In testimony whereof I affix my signature in presence of two witnesses.

JOSEPH H. COPE.

Witnesses:
   C. D. Charles,
   G. H. Teller.

---

Copies of this patent may be obtained for five cents each, by addressing the "Commissioner of Patents, Washington, D. C."